(12) United States Patent
Danielsson et al.

(10) Patent No.: US 10,691,949 B2
(45) Date of Patent: Jun. 23, 2020

(54) ACTION RECOGNITION IN A VIDEO SEQUENCE

(71) Applicant: Axis AB, Lund (SE)

(72) Inventors: Niclas Danielsson, Lund (SE); Simon Molin, Lund (SE)

(73) Assignee: Axis AB, Lund (SE)

( * ) Notice: Subject to any disclaimer, the term of this patent is extended or adjusted under 35 U.S.C. 154(b) by 200 days.

(21) Appl. No.: 15/812,685

(22) Filed: Nov. 14, 2017

(65) Prior Publication Data

US 2018/0137362 A1    May 17, 2018

(30) Foreign Application Priority Data

Nov. 14, 2016   (EP) ..................................... 16198678

(51) Int. Cl.
```
G06K 9/00    (2006.01)
G06K 9/68    (2006.01)
G06K 9/32    (2006.01)
```
(52) U.S. Cl.
CPC ..... *G06K 9/00718* (2013.01); *G06K 9/00335* (2013.01); *G06K 9/00744* (2013.01);
(Continued)

(58) Field of Classification Search
CPC ........... G06K 9/00335; G06K 9/00718; G06K 9/00744; G06K 9/00979; G06K 9/3233; G06K 9/685; G06K 2009/00738
See application file for complete search history.

(56) References Cited

U.S. PATENT DOCUMENTS

| | | | | |
|---|---|---|---|---|
| 8,295,597 | B1 * | 10/2012 | Sharma | .............. G06K 9/00342 |
| | | | | 382/173 |
| 9,158,974 | B1 | 10/2015 | Laska et al. | |

(Continued)

FOREIGN PATENT DOCUMENTS

| | | |
|---|---|---|
| CN | 102855462 A | 1/2013 |
| CN | 103106394 A | 5/2013 |

(Continued)

OTHER PUBLICATIONS

Karen Simonyan et al., "Two-Stream Convolutional Networks for Action Recognition in Videos", Visual Geometry Group, University of Oxford, published , pp. 11 (Year: 2014).*

(Continued)

*Primary Examiner* — Mekonen T Bekele
(74) *Attorney, Agent, or Firm* — Volpe and Koenig, P.C.

(57) ABSTRACT

A method and system for action recognition in a video sequence is disclosed. The system comprises a camera configured to capture the video sequence and a server configured to perform action recognition. The camera comprises an object identifier that identifies an object of interest in an object image frame of the video sequence; an action candidate recognizer configured to apply a first action recognition algorithm to the object image frame to detect presence of an action candidate; an video extractor configured to produce action image frames of an action video sequence by extracting video data pertaining to a plurality of image frames from the video sequence; and a network interface configured to transfer the action video sequence to the server. The server comprises an action verifier configured to apply a second action recognition algorithm to the action video sequence to verify or reject that the action candidate is an action.

12 Claims, 2 Drawing Sheets

(52) U.S. Cl.
CPC ....... *G06K 9/00979* (2013.01); *G06K 9/3233* (2013.01); *G06K 9/685* (2013.01); *G06K 2009/00738* (2013.01)

(56) References Cited

U.S. PATENT DOCUMENTS

| | | | | |
|---|---|---|---|---|
| 2012/0026308 | A1* | 2/2012 | Johnson | G06K 9/00369 348/77 |
| 2013/0021434 | A1* | 1/2013 | Ahiska | G08B 13/19691 348/36 |
| 2015/0199892 | A1* | 7/2015 | Johnson | G08B 21/0476 348/77 |
| 2015/0287310 | A1* | 10/2015 | Deliuliis | H04W 4/90 340/628 |
| 2016/0307143 | A1* | 10/2016 | Mongeon | G06Q 10/063114 |
| 2016/0358436 | A1* | 12/2016 | Wautier | G08B 13/19667 |
| 2016/0364966 | A1* | 12/2016 | Dixon | G08B 13/19606 |
| 2017/0155877 | A1* | 6/2017 | Johnson | A61B 5/1128 |
| 2017/0294091 | A1* | 10/2017 | Min | G06K 9/00711 |
| 2018/0349736 | A1* | 12/2018 | Bapat | G06K 9/00362 |

FOREIGN PATENT DOCUMENTS

| | | | |
|---|---|---|---|
| WO | WO-9907153 A1 * | 2/1999 | ............. G06T 7/254 |
| WO | 2013/093173 A1 | 6/2013 | |

OTHER PUBLICATIONS

"Smartphone-based Activity Recognition Using Hybrid Classifier Utilizing Cloud Infrastructure for Data Analysis", Yuan et al., In proceeding of the 4th International Conference on Pervasive and Embedded Computing and Communication Systems (Jan. 1, 2014) pp. 1-10; XP055363037; retrieved from the internet Apr. 7, 2017.
"Two-Stream Convolutional Networks for Action Recognition in Videos"; Simonyan et al.; Cornell University Library; arXiv:1406.2199 (Jun. 9, 2014) Computer Science, Computer Vision and Pattern Recognition; pp. 1-9.
EP 16198678.1 European Search Report (dated Apr. 21, 2017).

* cited by examiner

ACTION RECOGNITION IN A VIDEO SEQUENCE

FIELD OF INVENTION

The present teachings relate to action recognition in a video sequence.

BACKGROUND

Action recognition in a video sequence is the task of detecting certain pre-defined actions in the video sequence. Examples of actions to be detected may e.g. be people fighting, running, eating, playing a sports game. Action recognition normally requires excessive processing power which renders it unsuitable to perform on the digital video camera capturing the video sequence. Instead, the action recognition is typically performed by a server having the needed processing power. However, sending large amount of video over digital networks requires a significant amount of bandwidth.

Hence, there is a need for improved action recognition in a video sequence.

SUMMARY

In view of the above, it is an object of the disclosure to provide improved action recognition in a video sequence.

According to a first aspect a method for action recognition in a video sequence captured by a camera is provided. The method comprises: by circuitry of the camera: identifying an object of interest in an object image frame of the video sequence; applying a first action recognition algorithm to the object image frame and thereby detecting presence of an action candidate; producing action image frames of an action video sequence by extracting video data pertaining to a plurality of image frames from the video sequence, wherein one or more of the plurality of image frames from which the video data is extracted comprises the object of interest; and transferring the action video sequence to a server configured to perform action recognition; by circuitry of the server: applying a second action recognition algorithm to the action video sequence and thereby verifying or rejecting that the action candidate is an action of a pre-defined type.

This improved approach in action recognition is beneficial since it allows the processing power needed for the action recognition to be distributed over two different devices without the problem of taking up too much bandwidth in the communication between the camera and the server. Further, this approach in action recognition makes it possible to perform processor intense action recognition without loading the processor of the camera too much and at the same time without having to constantly stream the whole video sequence to the server. Hence, this improved approach allows for using a less processing demanding first type of action recognition algorithm locally on the camera and a more processing demanding second type of action recognition algorithm on the server. By extracting and only sending the action video sequence, rather than a continuous video stream, bandwidth may be saved. According to this approach in action recognition, a candidate action may be detected at the camera. The candidate action triggers the transferring of the action video sequence to the server wherein a more advanced action recognition analysis is performed. Thus the purpose of the on-camera action recognition is to trigger the detection of action candidates. The detection of the action candidate triggers transferring of the action video sequence to the server for further analysis, verifying or rejecting the action candidate as being an actual action.

The first action recognition algorithm may primarily be based on a contextual and/or spatial action recognition algorithm using contextual and/or spatial information in the object image frame. Contextual and/or spatial action recognition algorithms are normally not too processing power demanding. Hence, action recognition using that kind of algorithms are more easily doable locally on the camera.

The second action recognition algorithm may primarily be based on a temporal action recognition algorithm using temporal information of a plurality of image frames of the action video sequence. Temporal action recognition algorithms are typically more accurate in recognizing the action. Hence, a more accurate action recognition may be performed.

The act of producing the action image frames may comprise cropping the plurality of images frames of the video sequence such that the action image frames comprising the object of interest comprises at least a portion of the object of interest. This may save on bandwidth between the camera and the server.

The act of producing the action image frames may comprise cropping the plurality of images frames of the video sequence such that the action image frames comprising the object of interest comprises a portion of background at least partly surrounding the object of interest. By incorporating background at least partly surrounding the object of interest not only temporal but also contextual and/or spatial analysis of the action video sequence may be performed.

The act of transferring the action video sequence may comprise transferring coordinates within the action video sequence to the object of interest. The coordinates may be referring to which image frame or image frames comprises the object of interest and/or where in the respective image frame the object of interest is located.

The method may further comprise, by the circuitry of the camera, detecting an object of interest in the video sequence. The act of producing the action image frames may comprise extracting video data pertaining to a first predetermined number of image frames of the video sequence related to a point of time before detection of the object of interest. The act of producing the action image frames may comprise extracting video data pertaining to a second predetermined number of image frames of the video sequence related to a point of time after detection of the object of interest. This allows for improving the chance that the correct temporal window for the action to be recognized at the server is sent to the server.

The camera and the server may be separate physical entities positioned at a distance from each other. The camera and the server may be configured to communicate with each other via a digital network.

According to a second aspect a system for action recognition in a video sequence is provided. The system comprises: a camera configured to capture the video sequence and a server configured to perform action recognition. The camera comprising: an object identifier configured to identify an object of interest in an object image frame of the video sequence; an action candidate recognizer configured to apply a first action recognition algorithm to the object image frame and thereby detecting presence of an action candidate; an video extractor configured to produce action image frames of an action video sequence by extracting video data pertaining to a plurality of image frames from the video sequence, wherein one or more of the plurality of image frames from which the video data is extracted comprises the object of interest; and a network interface configured to transfer the action video sequence to the server. The server comprises an action verifier configured to apply a second action recognition algorithm to the action video sequence and thereby verify or reject that the action candidate is an action of a predefined type.

The video extractor may further be configured to crop the plurality of images frames of the video sequence such that the action image frames comprising the object of interest comprises at least a portion of the object of interest.

The video extractor may further be configured to crop the plurality of images frames of the video sequence such that the action image frames comprising the object of interest comprises a portion of background at least partly surrounding the object of interest.

The object identifier may further be configured to detect an object of interest in the video sequence. The video extractor may further be configured to extract video data pertaining to a first predetermined number of image frames of the video sequence related to a point of time before detection of the object of interest. The video extractor may further be configured to extract video data pertaining to a second predetermined number of image frames of the video sequence related to a point of time after detection of the object of interest.

The above mentioned features of the method, when applicable, apply to this second aspect as well. In order to avoid undue repetition, reference is made to the above.

A further scope of applicability of the present disclosure will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

A more detailed understanding may be had from the following description, given by way of example in conjunction with the accompanying drawings where.

As illustrated in the figures, the sizes of layers and regions are exaggerated for illustrative purposes and, thus, are provided to illustrate the general structures of embodiments. Like reference numerals refer to like elements throughout.

DETAILED DESCRIPTION

The teachings of the disclosure will now be described more fully hereinafter with reference to the accompanying drawings, in which currently preferred embodiments are shown. The teachings of this disclosure may, however, be embodied in many different forms and should not be construed as limited to the embodiments set forth herein; rather, these embodiments are provided for thoroughness and completeness, and to fully convey the scope of the disclosure to the skilled person.

Figure 1:
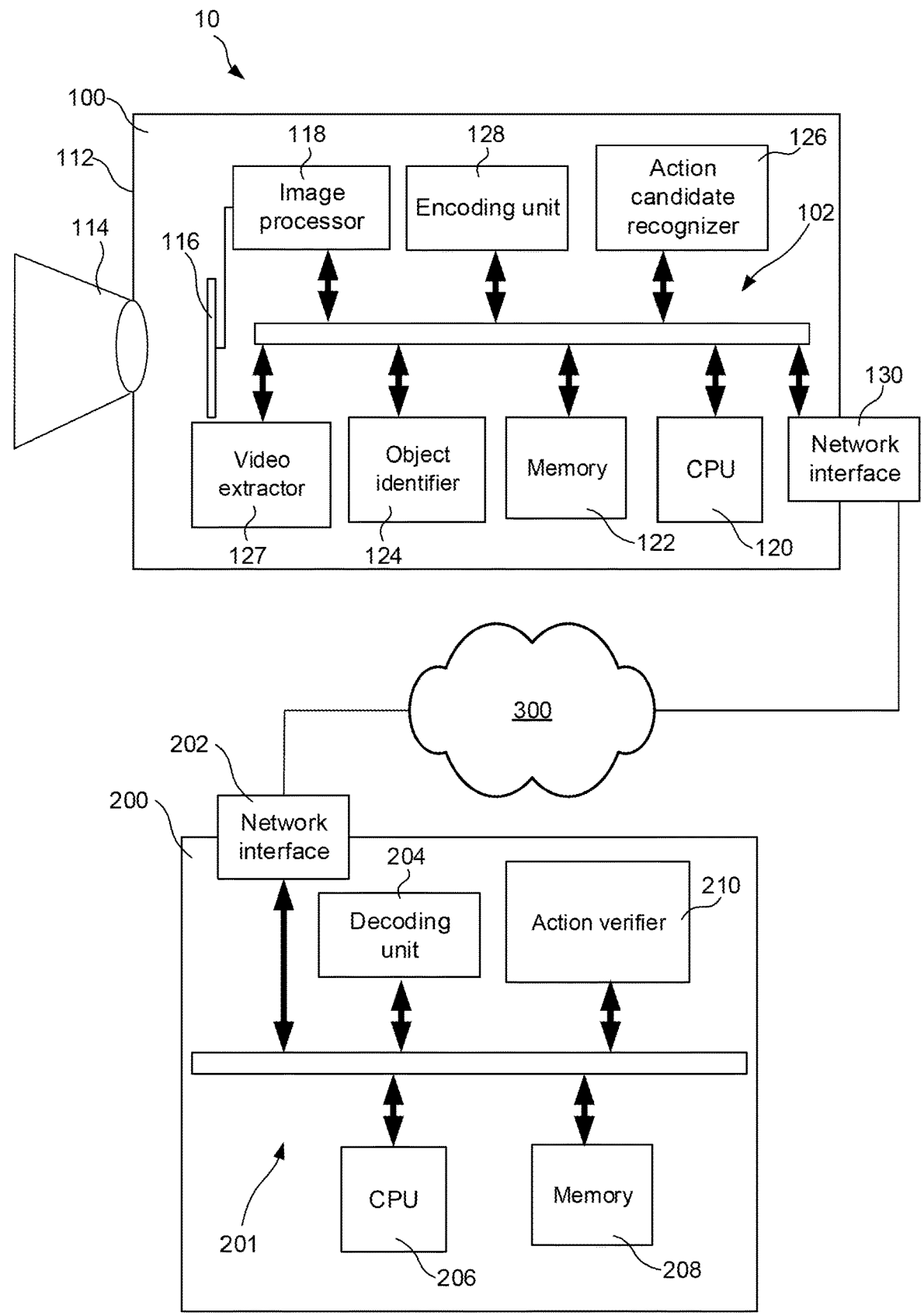
FIG. 1 illustrates a system for action recognition in a video sequence.

FIG. 1 illustrates a system for action recognition in a video sequence. The system comprises a digital network camera 100 and a server 200. The digital network camera 100 is connected to the server 200 via a digital network 300. The digital network camera 100 and the server 200 are separate physical entities positioned at a distance from each other and are configured to communicate with each other via the digital network 300.

The digital network 300 relates to a network which allow devices, e.g. the digital network camera 100 and the server 200, connected thereto to exchange digital data. Connections between devices connected to the digital network 300 are established using either cables or wirelessly. Non limiting examples of digital networks are the Internet, an intranet, a local area network and a cellular network. Parts of the digital network may be a private digital network. Parts of the digital network may be a public digital network. The private digital network may be connected to the public digital network by a network access limiting device (not shown). The network access limiting device may be a firewall installed to protect the private digital network. The network access limiting device may be a device performing Network Address Translation (NAT).

The digital network camera 100 is arranged to capture a video sequence depicting a scene. The digital network camera 100 comprises a housing 112, a lens 114 and circuitry 102. The digital network camera 100 is arranged to capture and process (and possibly also store) the video sequence. The circuitry 102 comprises an image sensor 116, an image processing unit 118, an object identifier 124, an action candidate recognizer 126, a video extractor 127 and a network interface 130. The circuitry 102 may further comprise one or more of a central processing unit, CPU, 120, a digital data storage medium (memory) 122 and an encoding unit 128. Any one of the image processing unit 118, the object identifier 124, the action candidate recognizer 126, the video extractor 127 and/or the encoding unit 128 may be implemented as a dedicated hardware circuit and/or software module. In case of being software implemented the software may be run on the CPU 120. The CPU 120 may be any suitable CPU for performing digital data processing. It shall also be noted that any dedicated hardware circuit may in part comprise software portions being run on a dedicated processor or on the CPU 120.

The memory 122 may be any kind of volatile or non-volatile memory. Further, the memory 122 may comprise a plurality of memory units. At least one of the plurality of memory units may be used as a buffer memory for buffering data while processing e.g. content of the video sequence.

The digital network camera 100 is arranged to be connected to the digital network 300 via the network interface 130. The connection to the digital network may be wired or wireless. Thus, the network interface 130 may be a network port adapted to 10/100/1000 Mbps data traffic, such as an Ethernet port, a modular port being arranged to receive a modular connector (e.g., a RJ45 connector). Normally, such a RJ45 connector port is arranged to receive a network cable, such as a twisted pair cable (e.g., of cat 5, cat 5e or cat 6). Alternatively, the I/O means of the network port may be a wireless I/O means using mobile internet communication standards (e.g., 1G, 2G, 2.5G, 2.75G, 3G, 3.5G, 3.75G, 3.9G, 4G, 5G) or using WiFi.

The camera components (i.e., the lens 114 and the image sensor 116) may be arranged to capture raw images wherein each raw image can be described as light of different wavelengths and originating from different objects and parts of objects. These raw images are then converted from analog to digital format and transferred into the image processing unit 118. According to this embodiment the digital network camera 100 is a camera arranged to capture photographical images. Alternatively or in combination, the image sensor 116 of the digital network camera 100 may be arranged to capture thermal images. Yet alternatively or in combination, the image sensor 116 of the digital network camera 100 may be arranged to capture radar images. Hence, the video sequence captured by the digital network camera 100 may be a representation of photographical images, a representation of thermal images, a representation of radar images or a combination thereof.

The object identifier 124 is configured to detect objects of interest in the video sequence captured by the camera 100. The object of interest may e.g. be a human, a face, a vehicle, a product on a conveyer band, an animal, terrain components, weapons etc. The object identifier 124 may further be configured to classify detected objects of interest. The object of interest may e.g. be classified as belonging to a specific type of object. Examples of specific type of objects are: humans, a faces, vehicles, products of a specific type. The object identifier 124 may further be configured to identify a point of time in the video sequence at which the object of interest where first detected. In connection with this the memory 122 may further be used as an image frame buffer configured to store a predetermined number of image frames. Hence, image frames representing image frames preceding the point of time in the video sequence at which the object of interest where first detected may be stored in the memory 122 acting as the image frame buffer.

The object identifier 124 is further configured to identify the object of interest in one or more image frames of the video sequence, an image frame wherein an object of interest has been identified will herein be referred to as an object image frame.

Action recognition in a video sequence is the task of detecting one or more predefined types of actions in the video sequence. Examples of predefined types of actions are people fighting, running, eating, playing a specific game, etc. Other examples of predefined types of actions are drunk driving detection, jump detection, anger detection, smile detection, hand signal detection, fall detection, loitering detection, gait detection, threatening behavior detection, suspicious behavior detection (e.g. detection of anomalous or unusual behavior).

Action recognition may be performed by still image contextual and/or spatial analysis or temporal analysis (or a combination of the two). Contextual and/or spatial action recognition algorithms are performed on still images, e.g. a single image frame of a video sequence. Temporal action recognition algorithms are performed on a plurality of image frames of a video sequence.

An example of a contextual action recognition algorithm is disclosed by Georgia Gkioxari, Ross Girshick and Jitendra Malik in "Contextual Action Recognition with R*CNN"; arXiv:1505.01197. Further examples of action recognition algorithms, both Contextual and/or spatial action recognition algorithms and temporal action recognition algorithms are for example described in CN102855462, in CN103106394, and by Karen Simonyan and Andrew Zisserman in "Two-Stream Convolutional Networks for Action Recognition in Videos"; arXiv: 1406.2199.

Hence, action recognition has two main approaches: still image contextual; and/or spatial analysis and temporal analysis. Whereas the most promising approaches use the temporal analysis as a primary action recognition algorithm, still-image approaches work fairly well in some cases. However, temporal action recognition is difficult and involve very processing intensive algorithms using e.g. Recurrent Neural Networks. This makes such temporal action recognition algorithms ill-suited to be performed on embedded devices such as the digital network camera 100.

The disclosure is directed towards using synergies between contextual and/or spatial action recognition algorithms, often being reasonably processing intensive, and processing intensive temporal action recognition algorithms. A first action recognition algorithm is run on the digital network camera 100 for finding action candidates and a second action recognition algorithm is run on the server 200 for verifying or rejecting that the action candidate is an actual action. The second action recognition algorithm is more processing demanding than the first action recognition algorithm. The first action recognition algorithm is primarily based on contextual and/or spatial action recognition. As a non-limiting example the first action recognition algorithm may solely be based a contextual and/or spatial action recognition algorithm. The second action recognition algorithm is primarily based on temporal action recognition. However, the second action recognition algorithm may comprise elements of contextual and/or spatial action recognition.

The action candidate recognizer 126 is configured to apply the first action recognition algorithm to at least one of the object image frames identified by the object identifier 124. By applying the first action recognition algorithm, presence of an action candidate is detected. The first action recognition algorithm analysis performed by the action candidate recognizer 126 does not need to detect the type of action. It only need to detect generic action candidates. However, the first action recognition algorithm may be configured to filter on different types of actions. Hence, by applying the first action recognition algorithm, presence of an action candidate of a predetermined type of action may be detected.

By applying the first action recognition algorithm, the action candidate recognizer 126 may be configured to detect unusual poses that are likely to indicate an action. Hence, to find an action candidate for an action. Further, the action candidate recognizer 126 may be configured to filter the detected poses in order to find an action candidate for an action of a predefined type. The first action recognition algorithm is a relatively lightweight algorithm. False positives are acceptable to some degree. Detection of an action candidate motivates a more advanced action recognition analysis using the second action recognition algorithm. Thus, the action candidate recognizer 126 is configured to trigger on likely action proposals, or action candidates as they are referred to herein.

Detecting an action candidate triggers sending an action video sequence, being a portion of the video sequence comprising the action candidate, to the server 200 for determining if the action candidate is an actual action or not by applying the second action recognition algorithm to the action video sequence.

The video extractor 127 is configured to produce action image frames of the action video sequence. The action video sequence is a portion of the video sequence comprising the action candidate. The action video sequence may have the same frame rate as the video sequence. The action video sequence may have a frame rate being smaller than the frame rate of the video sequence, i.e. the action video sequence having a frame rate having a lower number of frames per second, fps, than the video sequence. For example, the frame rate of the video sequence may be 60 fps and the frame rate of the action video sequence may be 30 fps.

Image frames of the action video sequence, herein called action image frames, are produced by extracting video data pertaining to a plurality of image frames from the video sequence. The video extractor 127 is configured such that one or more of the plurality of image frames, from which the video data is extracted, comprises the object of interest. Hence, at least one or more of the plurality of the action image frames is/are object image frame(s).

The video extractor 127 may further be configured to extract video data pertaining to a first predetermined number of image frames of the video sequence related to a point of time before the identified point of time in the video sequence at which the object of interest where detected. Hence, image frames of the video sequence may be cashed in the memory 122 for later usage in the action video sequence. This allows for including both the object image frame comprising the object of interest triggering the run of the first action recognition algorithm and image frame(s) preceding the object image frame to be included in the action video sequence. This improves the chance that the temporal window of the action video sequence comprises all relevant information pertaining to the action performed by the object of interest. As a non-limiting example, the first predetermined number of image frames may be set depending on one or more of: the type of object of interest or the type of action of the action candidate. Moreover, as a further non-limiting example, a motion analysis of the object and possibly its surroundings may be used to reveal at which earlier image frame an action candidate started. By this it is made possible to, from a relatively large prebuffer, extract only the image frames that actually are likely to be relevant for the second action recognition. Hence, the first predetermined number of image frames may be dynamically set.

The video extractor 127 may further be configured to extract video data pertaining to a second predetermined number of image frames of the video sequence related to a point of time after the identified point of time in the video sequence at which the object of interest where detected. This allows for including both the object image frame comprising the object of interest triggering the run of the first action recognition algorithm and image frame(s) succeeding the object image frame to be included in the action video sequence. This improves the chance that the temporal window of the action video sequence comprises all relevant information pertaining to the action performed by the object of interest. The second predetermined number of image frames may be set depending on one or more of: the type of object of interest or the type of action of the action candidate. Moreover, as a further non-limiting example, a motion analysis of the object and possibly its surroundings may be used to reveal at which image frame the action candidate ended. By this it is made possible to extract only the image frames that actually are likely to be relevant for the second action recognition. Hence, the second predetermined number of image frames may be dynamically set.

The video extractor 127 may further be configured to extract information pertaining to coordinates within the action video sequence to the object of interest. The coordinates may be referring to which image frame or image frames that comprise the object of interest and/or where in the respective image frame the object of interest is located. These coordinates may be transferred to the server together with the action video sequence.

The video extractor 127 may further be configured to crop the video data of the plurality of image frames when producing the action image frames. The video data of the plurality of image frames may be cropped such that the action image frames comprising the object of interest comprises at least a portion of the object of interest. Moreover, the video data of the plurality of images frames may be cropped such that the action image frames comprising the object of interest comprises a portion of background at least partly surrounding the object of interest. By incorporating background at least partly surrounding the object of interest, not only temporal but also contextual and/or spatial analysis of the action video sequence may be performed.

The encoding unit 128 is arranged to encode the digital video data of a video sequence using video encoding. Non-limiting examples of video encoding are video encoding standards of the ISO/MPEG or ITU-H.26X families. The encoding unit 128 is arranged to encode images of the digital video data, henceforth referred to as encoded digital video data. The encoded digital video data may be directly transmitted over a digital network 300 via the network interface 130. Alternatively, the encoded digital video data may be stored in the memory 122 for later transmission, via the network interface 130, over the digital network 300. The encoding unit 128 may be configured to encode the action video sequence before the action video sequence is transferred to the server 200.

The network interface 130 is configured to transfer the action video sequence to the server 200.

The server 200 comprises circuitry 201 comprising an action verifier 210. The circuitry 201 may further comprise one or more of a network interface 202, a decoding unit 204, a central processing unit, CPU, 206 and a digital data storage medium (memory) 208. Any one of the decoding unit 204 and/or the action verifier 210 may be implemented as a dedicated hardware circuit and/or software module. In case of being software implemented the software may be run on the CPU 206. The CPU 206 may be any suitable CPU for performing digital data processing. It shall also be noted that any dedicated hardware circuit may in part comprise software portions being run on a dedicated processor or on the CPU 206.

The server 200 is arranged to be connected to the digital network 300 via the network interface 202. The connection to the digital network may be wired or wireless. Thus, the network interface 202 may be a network port adapted to 10/100/1000 Mbps data traffic, such as an Ethernet port, a modular port being arranged to receive a modular connector (e.g., a RJ45 connector). Normally, such a RJ45 connector port is arranged to receive a network cable, such as a twisted pair cable (e.g., of cat 5, cat 5e or cat 6). Alternatively, the I/O means of the network port may be a wireless I/O means using mobile internet communication standards (e.g., 1G, 2G, 2.5G, 2.75G, 3G, 3.5G, 3.75G, 3.9G, 4G, 5G) or using WiFi.

In case of the action video sequence being encoded the decoding unit 204 is configured to decode the encoded video sequence. Hence, the decoding unit 204 is arranged to decode the digital video data of a video sequence using video decoding.

The memory 122 may be any kind of volatile or non-volatile memory. Further, the memory 122 may comprise a plurality of memory units. At least one of the plurality of memory units may be used as a buffer memory for buffering data while processing e.g. the action video sequence. The memory 122 may further store the whole or portions of the action video sequence.

The action verifier 210 is configured to apply the second action recognition algorithm to the action video sequence. Thereby it may be verified or rejected that the action candidate is an actual action. Especially, it may be verified or rejected that the action candidate is an action of a predefined type of action. The action recognition performed by the action verifier 210 does not necessarily have to be performed in real time. This since the action is a short time event rather than constantly ongoing and the important thing is to figure out if an alarm for a specific type of action should be raised or not.

Figure 2:
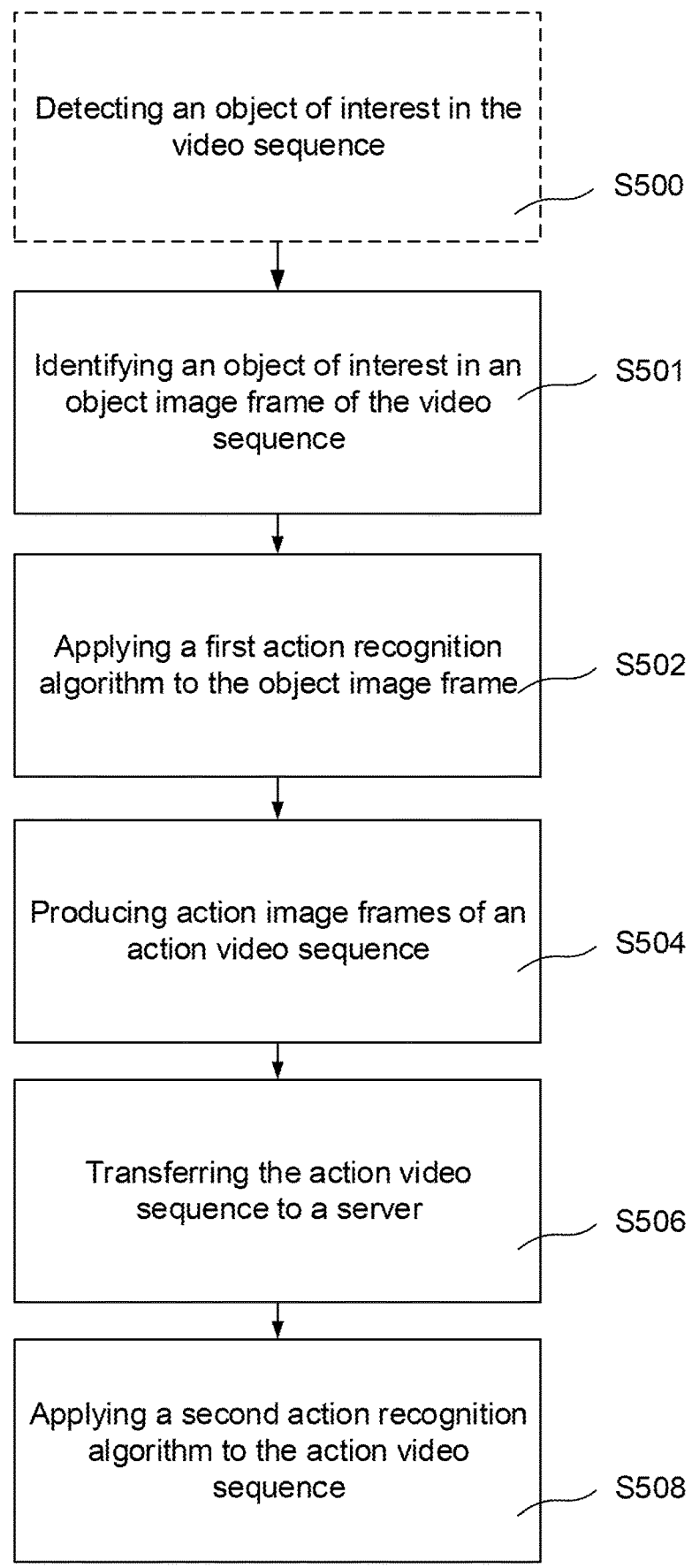
FIG. 2 is a block scheme of a method for action recognition in a video sequence.

With reference to FIG. 2 a method for a method for action recognition in a video sequence captured by the camera 100. The method comprises by circuitry 102 of the camera (100): identifying S501 an object of interest in an object image frame of the video sequence; applying S502 the first action recognition algorithm to the object image frame and thereby detecting presence of an action candidate; producing S504 action image frames of an action video sequence by extracting video data pertaining to a plurality of image frames from the video sequence, wherein one or more of the plurality of image frames from which the video data is extracted comprises the object of interest; and transferring S506 the action video sequence to the server 200.

The method further comprises, by circuitry 201 of the server 200, applying S508 the second action recognition algorithm to the action video sequence and thereby verifying or rejecting that the action candidate is an action of a predefined type.

The act of producing S504 the action image frames may comprise cropping the plurality of images frames of the video sequence such that the action image frames comprising the object of interest comprises at least a portion of the object of interest.

The act of producing S504 the action image frames may comprise cropping the plurality of images frames of the video sequence such that the action image frames comprising the object of interest comprises a portion of background at least partly surrounding the object of interest.

The act of transferring 506 the action video sequence may comprise transferring coordinates within the action video sequence to the object of interest. The coordinates may be referring to which image frame or image frames comprises the object of interest and/or where in the respective image frame the object of interest is located.

The method may further comprise, by the circuitry 102 of the camera 100, detecting S500 an object of interest in the video sequence. The act of producing S504 the action image frames may comprise extracting video data pertaining to the first predetermined number of image frames of the video sequence related to a point of time before detection of the object of interest. The act of producing S504 the action image frames may comprise extracting video data pertaining to the second predetermined number of image frames of the video sequence related to a point of time after detection of the object of interest.

The person skilled in the art realizes that the present disclosure is by no means is limited to the embodiments described above. On the contrary, many modifications and variations are possible within the scope of the appended claims.

For example, after verifying that the action candidate is an actual action the server 200 may be configured to send out an alarm trigger. The alarm trigger may be sent to the digital network camera 100 for further processing therein. For example, the digital network camera 100 may be configured to change a camera setting after receiving the alarm trigger. Non-limiting examples of camera settings that may be changed are: frame rate, resolution, light sensitivity, switch to HDR, trigger a speaker connected to the camera with a standard message, start PTZ tracking of the object of interest, trigger creation of an advanced appearance model for the detected object so that it may be tracked over several cameras, start radar tracking, switch to thermal mode, change thresholds for further action recognition, or check for a follow-up action of a related type (for instance, if a person falls, start searching for the action "rise up again", and trigger an alarm if he does not get up within a certain time threshold).

Alternatively or in combination, the alarm trigger may be sent to a video managing center, VMS. The alarm trigger may be used at the VMS for sending out notifications that an action of a predefined type has occurred.

Further, the server 200 may be implemented in various types of devices. Non-limiting examples of devices being implemented as the server 200 are a dedicated computer, another camera device, a video managing system, a cloud server, an analytics box near the camera, an access control unit, an IoT device with computing capability. Further, the server functionality may be distributed over different devices. Especially in the case of the action verifier 210 at least partly being implemented as software code portions being executed on a plurality of processors.

Moreover, the object of interest may be identified in a plurality of object image frames of the video sequence. The first action recognition algorithm may then be individually applied to each of the plurality of object image frames. The result of the individual application of the first action recognition algorithm may then be used for finding the action candidate. For example, individual analysis of a plurality of images may disclose that the legs of a person are always in different angles. This might indicate that the person is likely walking or running even. The action image frames of the action video sequence are thereafter produced by extracting video data pertaining to a plurality of image frames from the video sequence, wherein one or more of the plurality of image frames from which the video data is extracted comprises the object of interest.

Additionally, variations to the disclosed embodiments can be understood and effected by the skilled person in practicing the claims, from a study of the drawings, the disclosure, and the appended claims.

What is claimed is:

1. A method for action recognition in a video sequence captured by a camera, the method comprising:
   by circuitry of the camera:
   identifying an object of interest in an image frame of the video sequence;
   applying a first action recognition algorithm to the image frame to detect an action candidate, wherein the image frame is a single image comprising the object of interest, wherein the first action recognition algorithm uses contextual and/or spatial recognition information of the single image frame to detect the action candidate within the image frame;
   producing image frames of an action video sequence by extracting video data pertaining to a plurality of image frames from the video sequence, wherein one or more of the plurality of image frames from which the video data is extracted comprises the object of interest; and transferring the action video sequence to a server configured to perform action recognition; and by circuitry of the server:

applying a second action recognition algorithm to the action video sequence to verify or reject that the action candidate is an action of a predefined type, wherein the second action recognition algorithm uses temporal information of a plurality of image frames of the action video sequence.

2. The method according to claim 1, wherein the act of producing the image frames of the action video sequence comprises cropping the plurality of image frames of the video sequence such that the image frames comprising the object of interest comprises at least a portion of the object of interest.

3. The method according to claim 2, wherein the image frames of the action video sequence comprising the object of interest comprises a portion of background at least partly surrounding the object of interest.

4. The method according to claim 1, wherein the act of transferring the action video sequence comprises transferring coordinates within the action video sequence to the object of interest.

5. The method according to claim 1, wherein the method further comprises, by the circuitry of the camera:

detecting an object of interest in the video sequence, wherein the act of producing the image frames of the action video sequence comprises extracting video data pertaining to a first predetermined number of image frames of the video sequence related to a point of time before detection of the object of interest.

6. The method according to claim 1, wherein the method further comprises, by the circuitry of the camera:

detecting an object of interest in the video sequence, wherein the act of producing the image frames of the action video sequence comprises extracting video data pertaining to a second predetermined number of image frames of the video sequence related to a point of time after detection of the object of interest.

7. The method according to claim 1, wherein the camera and the server are separate physical entities positioned at a distance from each other and are configured to communicate with each other via a digital network.

8. A system for action recognition in a video sequence, the system comprising:

a camera configured to capture the video sequence and a server configured to perform action recognition, the camera comprising:

an object identifier configured to identify an object of interest in an image frame of the video sequence;

an action candidate recognizer configured to apply a first action recognition algorithm to the image frame to detect an action candidate, wherein the image frame is a single image comprising the object of interest, wherein the first action recognition algorithm uses contextual and/or spatial recognition information of the single image frame to detect the action candidate within the image frame;

a video extractor configured to produce image frames of an action video sequence by extracting video data pertaining to a plurality of image frames from the video sequence, wherein one or more of the plurality of image frames from which the video data is extracted comprises the object of interest; and a network interface configured to transfer the action video sequence to the server, the server comprising:

an action verifier configured to apply a second action recognition algorithm to the action video sequence to verify or reject that the action candidate is an action of a predefined type, wherein the second action recognition algorithm uses temporal information of a plurality of image frames of the action video sequence.

9. The system according to claim 8, wherein the video extractor is further configured to crop the plurality of images frames of the video sequence such that the image frames of the video sequence comprising the object of interest comprises at least a portion of the object of interest.

10. The system according to claim 8, wherein the video extractor is further configured to crop the plurality of images frames of the video sequence such that the image frames of the video sequence comprising the object of interest comprises a portion of background at least partly surrounding the object of interest.

11. The system according to claim 8, wherein the object identifier is further configured to detect an object of interest in the video sequence, wherein the video extractor is further configured to extract video data pertaining to a first predetermined number of image frames of the video sequence related to a point of time before detection of the object of interest.

12. The system according to claim 8, wherein object identifier is further configured to detect an object of interest in the video sequence, wherein the video extractor is further configured to extract video data pertaining to a second predetermined number of image frames of the video sequence related to a point of time after detection of the object of interest.

* * * * *